Oct. 13, 1959  M. E. CISNEY ET AL  2,908,716
PREPARING ORGANIC SULFIDES
Filed April 8, 1957

```
ALKYL ARYL ETHER WHEREIN
  ALKYL RADICAL CONTAINS
     1-20 CARBON ATOMS
             │
             ▼
       ADD: ARYL THIOL, ALKYL
(1-20 CARBON ATOMS) THIOL, or ARYL SUB-
STITUTED ALKYL (1-20 CARBON ATOMS) THIOL
             │
             ▼
   REACT IN ALKALINE MEDIUM AT
           180-500° C.
             │
             ▼
     ORGANIC SULFIDE PRODUCT
```

MERLE E. CISNEY,
DAVID W. GOHEEN,
INVENTORS

BY *Eugene D. Farley*

ATTORNEY

2,908,716
PREPARING ORGANIC SULFIDES

Merle E. Cisney and David W. Goheen, Camas, Wash., assignors to Crown Zellerbach Corporation, San Francisco, Calif., a corporation of Nevada Application April 8, 1957, Serial No. 651,495

15 Claims. (Cl. 260—609)

This invention relates to a process for making organic sulfides, particularly dimethyl sulfide.

The organic sulfides are useful or potentially useful in many applications, for example as odorants for addition to odorless gases to allow their detection or tracing, as solvents, and as raw materials in the synthesis of various organic derivatives such as the sulfoxides and ternary sulfonium compounds. Their use in these various applications is substantially restricted, however, by their relatively high cost.

It is the general object of the present invention to provide a process for making organic sulfides, particularly dimethyl sulfide, in substantial yields from low cost materials by an economical procedure which can be operated as an adjunct of subsisting chemical procedures.

It is another important object of the present invention to provide a process for making dimethyl sulfide in substantial yields from the spent liquors resulting from the alkaline pulping of lignocellulose, wherein the liquor remains fluid after treatment and may be pumped back to the pulping system for recovering its content of inorganic pulping chemicals.

We have discovered that organic sulfides may be prepared efficiently and in high yields by reacting a substance containing an alkyl aryl ether of the formula R—O—Ar wherein R is an alkyl radical containing from 1–20 carbon atoms and Ar is an aryl radical, with at least one thiol of the group consisting of the aryl thiols and the alkyl- and aryl substituted alkyl-thiols wherein the alkyl group contains from 1–20 carbon atoms. Specifically, dimethyl sulfide may be prepared economically and in large total amounts by reacting with methyl mercaptan spent liquor resulting from the pulping of lignocellulose and containing alkyl ethers in the form of the legnin derivatives normally present in such liquors.

When these reactants are reacted with each other in alkaline liquid medium at a temperature of 180–500° C., the thiol cleaves the alkyl aryl ether to form the corresponding sulfide. Thus methyl mercaptan cleaves the methoxy groups present on the lignin compounds found in spent liquor, producing dimethyl sulfide.

Considering the foregoing in greater detail and with particular reference to the drawing comprising a flow plan of the herein described process:

Suitable alkyl aryl ethers for use in the herein described process broadly comprise those ethers having the general formula R—O—Ar wherein R is an alkyl radical containing from 1–20 carbon atoms, preferably from 1–12 carbon atoms, and Ar is an aryl radical. Illustrative of suitable aryl radicals are the phenyl, tolyl, benzyl, naphthyl, and anthracyl radicals as well as the various aromatic nuclei found in natural products such as lignin. Examples of suitable ethers thus are substituted aliphatic ethers of benzene, such as guaiacol, vanillin, conidendrin, dihydroquercetin, quercetin, lignin, and the lignin derivatives found in the spent liquors derived from the pulping of lignocellulose. These and other alkyl aryl ethers, as well as the unsubstituted aliphatic ethers of benzene such as anisole, phenetole and their homologs, may be used with a thiol singly or in combination with each other in the herein described reaction to produce an organic sulfide.

In general, the thiols which are suitable for use in the herein described procedure comprise the aryl thiols, the alkyl thiols, and the aryl substituted alkyl thiols wherein the alkyl group contains from 1–20 carbon atoms, preferably from 1–12 carbon atoms. Illustrative of suitable thiols are methyl mercaptan, ethyl mercaptain, the propyl mercaptans, the butyl mercaptans, lauryl mercaptan, thiophenol and the like.

The spent pulping liquors may be of any of the conventional classes obtained as byproducts from the pulping of lignocellulose by the kraft, soda, or sulfite processes, the first named being preferred.

Where spent pulp mill liquor is used as the source of the alkyl aryl ether, and where the liquor does not inherently have an alkaline reaction, its pH first is adjusted to the alkaline side, preferably to a pH level of at least 10. This may be accomplished by the addition of any of the usual basic materials such as the basic acting compounds of the alkali metals or the alkaline earth metals.

In general, substantially the equivalent amount of thiol is combined with the ether, i.e. the amount theoretically required to cleave the ether and form the sulfide. Where the ether comprises a lignin derivative contained in pulp mill spent liquor, the methoxyl content of the liquor may be calculated and the amount of mercaptan required to react therewith combined with it.

The thiol preferably is reacted with an alkaline material to convert it to the form of a salt before mixing it with the ether. To this end it may be mixed with substantially the equivalent amount of a basic acting compound of an alkali metal or other suitable basic acting compound in a liquid medium. Thus methyl mercaptan may be reacted in an aqueous solution of sodium hydroxide to form sodium mercaptide. In the alternative, if the ether is contained in a medium which is sufficiently alkaline, the thiol may be added directly to the ether whereupon it is converted to the corresponding salt.

In either event, i.e. in the case wherein the thiol is added directly to an alkaline, ether-containing medium, or in the case where the thiol first is reacted with an alkali and the resulting mercaptide added to the ether, the reaction mixture is placed in a suitable reaction vessel, preferably one provided with means for heating the mixture under pressure and agitating it during the reaction period. The mixture then is heated to a temperature of from 180–500° C., preferably 200–350° C. at autogenous pressure for a time sufficient to produce a substantial amount of organic sulfide. In a typical instance this may require from 3 or 4 minutes to about 3 hours. The vessel then is opened, and the reaction mixture distilled for separation of the sulfide product.

The presently described process is illustrated in greater detail in the following examples:

Example 1

Black liquor from pulping a mixture of Douglas fir and western hemlock, 500 g. of 53.4% by weight solids, was treated with 37.2 g. methyl mercaptan (about the stoichiometric amount) in 125 g. of 30% sodium hydroxide. The resulting mixture was heated in a rocking autoclave at 240° C. over a rise time of 65–70 minutes and hold there for 10 minutes at autogenous pressure. The gaseous product then was passed first through a water cooled condenser equipped with a receiver and then into a Dry Ice trap. The total yield of dimethyl sulfide was 25.3 grams. This represented a 53% yield, based on the theoretical, or a 62% yield based on the mercaptan consumption.

Example 2

Sodium-base sulfite spent liquor resulting from the pulping of a mixture of hemlock and white fir (500 g. of 52.4% by weight solids), was treated with 50% sodium hydroxide to pH 10. Then a paste of 27 grams of methyl mercaptan in 92 g. of 30% caustic was added and the pH adjusted to 12.5 with additional caustic.

The mixture was heated in a rocking autoclave to 240° C. over a 90 minute period, held at that temperature and autogenous pressure for 10 minutes, and distilled for 15 minutes, the gases being led first to a condenser and then into a Dry Ice trap. The yield of dimethyl sulfide was 19.35 grams (56% of the theoretical).

Example 3

500 grams black liquor containing 52.1% solids derived from the kraft pulping of a mixture of Douglas fir and western hemlock and estimated to contain 23.5 g. methoxyl was treated with 68.4 g. butyl mercaptan in 110 g. 30% sodium hydroxide. The mixture was heated to 240° C. in 90 minutes and held for 30 minutes at that temperature and autogenous pressure.

The gases were distilled to give a yield of 71.5 g. of crude product. This contained 14.3 g. unreacted butyl mercaptan and 57 g. crude methyl butyl sulfide. The yield was 72% theoretical.

Example 4

500 grams kraft black liquor (52.1% solids) derived from the pulping of a mixture of Douglas fir and western hemlock was treated with a semi-solid mush containing 153 g. lauryl mercaptan in 110 ml. 30% sodium hydroxide. The mixture was heated to 250° C. over 90 minutes and held under pressure at that temperature for 35 minutes. Upon cooling, an oily layer separated which was washed with potassium hydroxide for mercaptan removal and dried over magnesium sulfate. It then was distilled to give a 41 g. yield of lauryl methyl sulfide, or 25% of the theoretical.

Example 5

300 grams kraft black liquor (52.1% solids) was treated with 49.6 g. thiophenol in 70 g. of 30% sodium hydroxide in a rocking autoclave. The mixture was heated to a temperature of 240° C. over 90 minutes and maintained at that temperature under pressure for 20 minutes. Thereafter it was distilled and the product washed with 30% potassium hydroxide to leave a residue of 28.4 grams of thioanisole (53% of theoretical).

Example 6

Conidendrin (200 g., 0.56 mole) was dissolved in a 1500 ml. solution of methyl mercaptan (53.8 g., 1.12 moles) and sodium hydroxide (112 g., 2.8 moles). The mixture was placed in an autoclave and heated with agitation to 240° C. over 45 minutes, held at that temperature for 25 minutes and distilled. A yield of 48.5 g. dimethyl sulfide (70% of theoretical) was obtained.

Example 7

Vanillin (85 g., 0.56 mole) was dissolved in 300 g. of 10% sodium hydroxide. Then methyl mercaptan (27 g., 0.56 mole) in 135 g. of 20% sodium hydroxide was added. The mixture was heated in a rocking autoclave to 240° C. over 90 minutes, held 10 minutes and distilled. There were obtained 26.2 g. of dimethyl sulfide (75% of theoretical).

Example 8

Phenetole (61 g., 0.5 mole) was added to 400 g. of 10% sodium hydroxide. Then methyl mercaptan (33 g., 0.69 mole) in 33 g. sodium hydroxide dissolved in 130 ml. water was added. The mixture was heated in a rocking autoclave to 255° C. over 95 minutes, held for 90 minutes and distilled. The yield of methyl ethyl sulfide was 33%.

Having thus described our invention, we claim:

1. A process for preparing organic sulfides which comprises reacting a substance containing an alkyl aryl ether of the formula R—O—Ar wherein R is an alkyl radical containing from 1 to 20 carbon atoms and Ar is an aryl radical, with at least one thiol of the group consisting of the aryl thiols, the alkyl thiols, and the aryl substituted alkyl-thiols wherein the alkyl group contains from 1 to 20 carbon atoms, the reaction being carried out in an alkaline liquid medium at a temperature of 180–500° C. for a time sufficient to produce a substantial amount of organic sulfide, and recovering the organic sulfide from the reaction mixture.

2. The process of claim 1 wherein R is an alkyl radical containing from 1 to 12 carbon atoms.

3. The process of claim 1 wherein R—O—Ar is a substituted aliphatic ether of benzene.

4. The process of claim 1 wherein the substance containing an alkyl aryl ether comprises spent liquor from the pulping of lignocellulose.

5. The process of claim 1 wherein the substance containing an alkyl aryl ether comprises spent liquor from the alkaline pulping of lignocellulose.

6. The process of claim 1 wherein the substance containing an alkyl aryl ether comprises kraft black liquor.

7. The process of claim 1 wherein the substance containing an alkyl aryl ether comprises soda spent liquor.

8. The process of claim 1 wherein the substance containing an alkyl aryl ether comprises sulfite spent liquor.

9. The process of claim 1 wherein the substance containing an alkyl aryl ether comprises conidendrin.

10. The process of claim 1 wherein the substance containing an alkyl aryl ether comprises vanillin.

11. The process of claim 1 wherein the thiol comprises methyl mercaptan.

12. The process of claim 1 wherein the reaction is carried out in an alkaline liquid medium having a pH of at least 10.

13. The process of claim 1 wherein the reaction is carried out at a temperature of from 200–350° C.

14. A process for preparing organic sulfides which comprises reacting with methyl mercaptan spent liquor from the pulping of lignocellulose, the reaction being carried out in an alkaline liquid medium having a pH of at least 10 at a temperature of between 200 and 350° C. for a time sufficient to produce a substantial amount of dimethyl sulfide, and recovering the dimethyl sulfide from the reaction mixture.

15. The process of claim 14 wherein the spent liquor comprises kraft black liquor.

References Cited in the file of this patent

UNITED STATES PATENTS 2,711,430     Hagglund et al. _____ June 21, 1955